US012797810B2

(12) United States Patent
Tamminga et al.

(10) Patent No.: US 12,797,810 B2
(45) Date of Patent: Nov. 17, 2026

(54) KNIFE FOR AUGER

(71) Applicant: JAY-LOR INTERNATIONAL INC., East Garafraxa (CA)

(72) Inventors: Jakob Tamminga, East Garafraxa (CA); Nathan Bouwman, Fergus (CA)

(73) Assignee: JAY-LOR INTERNATIONAL INC., East Garafraxa (CA)

(*) Notice: Subject to any disclaimer, the term of this patent is extended or adjusted under 35 U.S.C. 154(b) by 1021 days.

(21) Appl. No.: 17/862,663

(22) Filed: Jul. 12, 2022

(65) Prior Publication Data

US 2023/0049686 A1 Feb. 16, 2023

Related U.S. Application Data

(60) Provisional application No. 63/220,604, filed on Jul. 12, 2021.

(51) Int. Cl.
*B01F 27/1144* (2022.01)
*A01K 5/00* (2006.01)
*B01F 27/1123* (2022.01)

(52) U.S. Cl.
CPC .......... *B01F 27/1144* (2022.01); *A01K 5/004* (2013.01); *B01F 27/1123* (2022.01)

(58) Field of Classification Search
CPC ......... A01K 5/002; A01K 5/004; B01F 27/92; B01F 27/1144
See application file for complete search history.

(56) References Cited

U.S. PATENT DOCUMENTS

| | | | | |
|---|---|---|---|---|
| 5,601,362 A * | 2/1997 | Schuler | B01F 27/92 366/323 |
| 6,092,750 A * | 7/2000 | Kooima | B02C 19/22 241/101.76 |
| 2010/0108794 A1 * | 5/2010 | Tamminga | A01K 5/004 366/314 |

* cited by examiner

*Primary Examiner* — Elizabeth Insler
(74) *Attorney, Agent, or Firm* — H. Jay Spiegel

(57) ABSTRACT

A knife for attachment to auger flighting for a bulk mixer is provided. The knife comprises an exterior cutting side, a leading end defined as the front end during rotation of the auger, a trailing end opposite the leading end. The knife includes an inboard side adapted for attachment to the auger flighting. The exterior cutting side comprises a blade edge therealong for engaging material to be cut; an angled section along a portion of the blade edge, angled upward from horizontal (angled upward from the longitudinal plane of the knife) by X°. A base knife for attachment directly or indirectly to a bottom flight of an auger flighting in also provided.

20 Claims, 16 Drawing Sheets

400
415
425
450
445
440
435
410
420
K
J
H
G
150°
160°
170°
SECTION K-K

SECTION J-J

SECTION H-H

SECTION G-G 800
810
815
820
825
830
835
840
845
850
855

833
A
A
B
B
C
C
D
D
835
SECTION A-A

840
SECTION B-B

845
SECTION C-C

850
SECTION D-D

KNIFE FOR AUGER

RELATED APPLICATIONS

This application claims priority to U.S. Provisional Patent Application Ser. No. 63/220,604 filed Jul. 12, 2021 and herein incorporated by reference in its entirety.

FIELD OF INVENTION

The invention relates to knives for augers and more specifically to a knife with an angled or tilted edge for use with an auger in a bulk mixer.

BACKGROUND

Feed for livestock typically includes different ingredients which are required to be mixed together and cut before they are provided to the livestock. For example, hay may be mixed with a variety of feed supplements, such as vitamins, and cut to provide a bulk feed material. Various mixers are known which are designed to mix and cut the bulk feed material to a desired extent. Vertical feed mixers are disclosed, for instance, in U.S. Pat. No. 5,863,122 (Tamminga) and in U.S. Pat. No. 5,462,354 (Neier).

In conventional use, the components of the bulk material are mixed together and cut by rotation of the auger. The material is cut by knives located on the flighting of the auger. During operation of the auger, the feed typically travels upward along the auger and downward along another portion of the auger due to the pitch of the auger flighting as it rotates. Material coming into contact with the knives are on the auger flighting is cut. However, conventional flat knives do not cut the material efficiently resulting in longer cut times to reach a desired level of cutting.

A need therefore exists for a knife which can effectively cut the material and reduce cut time or decrease wear without requiring significant increase in power consumption.

SUMMARY OF INVENTION

In one embodiment, the invention provides for a knife for attachment to auger flighting, the knife comprising:

- an exterior cutting side,
- a leading end defined as the front end during rotation of the auger,
- a trailing end opposite the leading end;
- an inboard side adapted for attachment to the auger flighting;
- the exterior cutting side comprising:
  - a blade edge therealong for engaging material to be cut;
  - an angled section along a portion of the blade edge, angled upward from horizontal (angled upward from the longitudinal plane of the knife) by X°.

In another embodiment of the knife or knives as outlined above, the angled section is positioned towards or at the trailing end.

In another embodiment of the knife or knives as outlined above, the exterior cutting side comprises a plurality of angled sections, each angled section along a portion of the blade edge and each angled upward from horizontal by X°.

In another embodiment of the knife or knives as outlined above, the angled sections are positioned adjacent one another.

In another embodiment of the knife or knives as outlined above, the angled sections are positioned such that one angled section is at the trailing end.

In another embodiment of the knife or knives as outlined above, each angled section is angled upward from horizontal at a different angle X°.

In another embodiment of the knife or knives as outlined above, each angled section positioned closer to the trailing end has a greater upward angle from horizontal.

In another embodiment of the knife or knives as outlined above, X is from about 1 to about 90.

In another embodiment of the knife or knives as outlined above, X is from about 1 to about 45.

In another embodiment of the knife or knives as outlined above, X is from about 7 to about 40.

In another embodiment of the knife or knives as outlined above, the exterior cutting side comprises three adjacent angled sections, each angled section having a greater upward angle from horizontal relative its proximity to the trailing end.

In another embodiment of the knife or knives as outlined above, the exterior cutting side further comprises a flat section with substantially no angle upward from horizontal positioned at or toward the leading end.

In another embodiment of the knife or knives as outlined above, the three angled sections have an angle of about 7-10°, about 14-20° and about 21-30°, respectively.

In another embodiment of the knife or knives as outlined above, the blade edge is serrated.

In another embodiment of the knife or knives as outlined above, at least a portion of an underside of the knife comprises a tungsten carbine coating.

In another embodiment of the knife or knives as outlined above, the angled section or sections of the knife are integrated together and the angle is variable along its length.

In an even further embodiment, the present invention provides for a base knife for attachment directly or indirectly to a bottom flight of an auger flighting, the knife comprising:

- an exterior cutting side,
- a leading end defined as the front end during rotation of the auger,
- a trailing end opposite the leading end;
- in inboard side adapted for attachment to the auger flighting;
- a longitudinal bend between the exterior cutting side and the inboard side;
- the exterior cutting side comprising:
  - a blade edge therealong for engaging material to be cut;
  - an angled section along a portion of the blade edge, angled inward from a plane defined by the knife area between the longitudinal bend and the cutting side (angled inward toward the auger post when mounted to an auger) by Y°.

In another embodiment of the base knife or knives as outlined above, the angled section is positioned towards or at the trailing end.

In another embodiment of the base knife or knives as outlined above, the exterior cutting side comprises a plurality of angled sections, each angled inward from a plane defined by the knife area between the longitudinal bend and the cutting side by Y°.

In another embodiment of the base knife or knives as outlined above, the angled sections are positioned adjacent one another.

In another embodiment of the base knife or knives as outlined above, the angled sections are positioned such that one angled section is at the trailing end.

In another embodiment of the base knife or knives as outlined above, each angled section is angled inward from the plane at a different angle Y°.

In another embodiment of the base knife or knives as outlined above, each angled section positioned closer to the trailing end has a greater angle from the plane.

In another embodiment of the base knife or knives as outlined above, Y is from about 1 to about 90.

In another embodiment of the base knife or knives as outlined above, Y is from about 1 to about 45.

In another embodiment of the base knife or knives as outlined above, Y is from about 7 to about 40.

In another embodiment of the base knife or knives as outlined above, the exterior cutting side comprises three adjacent angled sections, each angled section having a greater angle from the plane relative its proximity to the trailing end.

In another embodiment of the base knife or knives as outlined above, the exterior cutting side further comprises a flat section with substantially no angle from the plane at or toward the leading end.

In another embodiment of the base knife or knives as outlined above, the three angled sections have an angle of about 7-10°, about 14-20° and about 21-30°, respectively.

In another embodiment of the base knife or knives as outlined above, the blade edge is serrated.

In another embodiment of the base knife or knives as outlined above, at least a portion of the knife comprises a tungsten carbine coating.

In another embodiment of the base knife or knives as outlined above, the angled section or sections of the knife are integrated together and the angle is variable along its length.

In a further embodiment, the present invention provides for an auger comprising a knife mounted to flighting thereon, the knife as defined in any one of the embodiments outlined herein.

In a further embodiment, the auger is a vertical auger for use in a vertical mixer.

In a further embodiment, the present invention provides for a vertical mixer comprising a knife as defined herein or an auger as defined herein.

In a further embodiment, the mixer is a feed mixer.

BRIEF DESCRIPTION OF THE DRAWINGS

FIG. 3B is a cross-section view taken along A-A.

FIG. 3C is a cross-sectional view taken along B-B.

FIG. 3D is a cross-sectional view taken along C-C.

FIG. 3E is a cross-sectional view taken along D-D.

FIG. 5C is an exploded view of the knife for an auger mounted on the flighting of an auger as shown in FIG. 5B.

FIGS. 6D-6G are cross-sections views taken along A-A, B-B, C-C and D-D, respectively.

FIGS. 7D-7H are cross-sectional views taken along A-A, B-B, C-C, D-D and E-E, respectively.

FIGS. 9C to 9G are cross-sectional views taken along A-A, B-B, C-C, D-D and E-E, respectively.

FIGS. 10C to 10F are cross-sectional views taken along A-A, B-B, C-C and D-D, respectively.

DETAILED DESCRIPTION

Described herein are examples and embodiments of knives for augers, augers comprising knives mounted thereon and vertical mixers comprising augers with the knives mounted thereon. It will be appreciated that embodiments and examples are provided herein for illustrative purposes intended for those skilled in the art and are not meant to be limiting in any way. All references to embodiments or examples throughout this disclosure should be considered as references to illustrative and non-limiting embodiments and illustrative and non-limiting examples. It will be appreciated that none of the features disclosed herein are intended to be essential unless specifically stipulated as such. Reference to any dimensions or measurements is for illustrative purposes and are not intended to be limiting and are not intended to be an exact and limiting measurement. The term “about” is intended to be applied to all such dimensions and measurements and at least accounts for inaccuracies and error associated with taking such measurements, the devices for taking such measurements, the tools used for manufacturing the products and the variation in manufacturing.

Figure 1A:
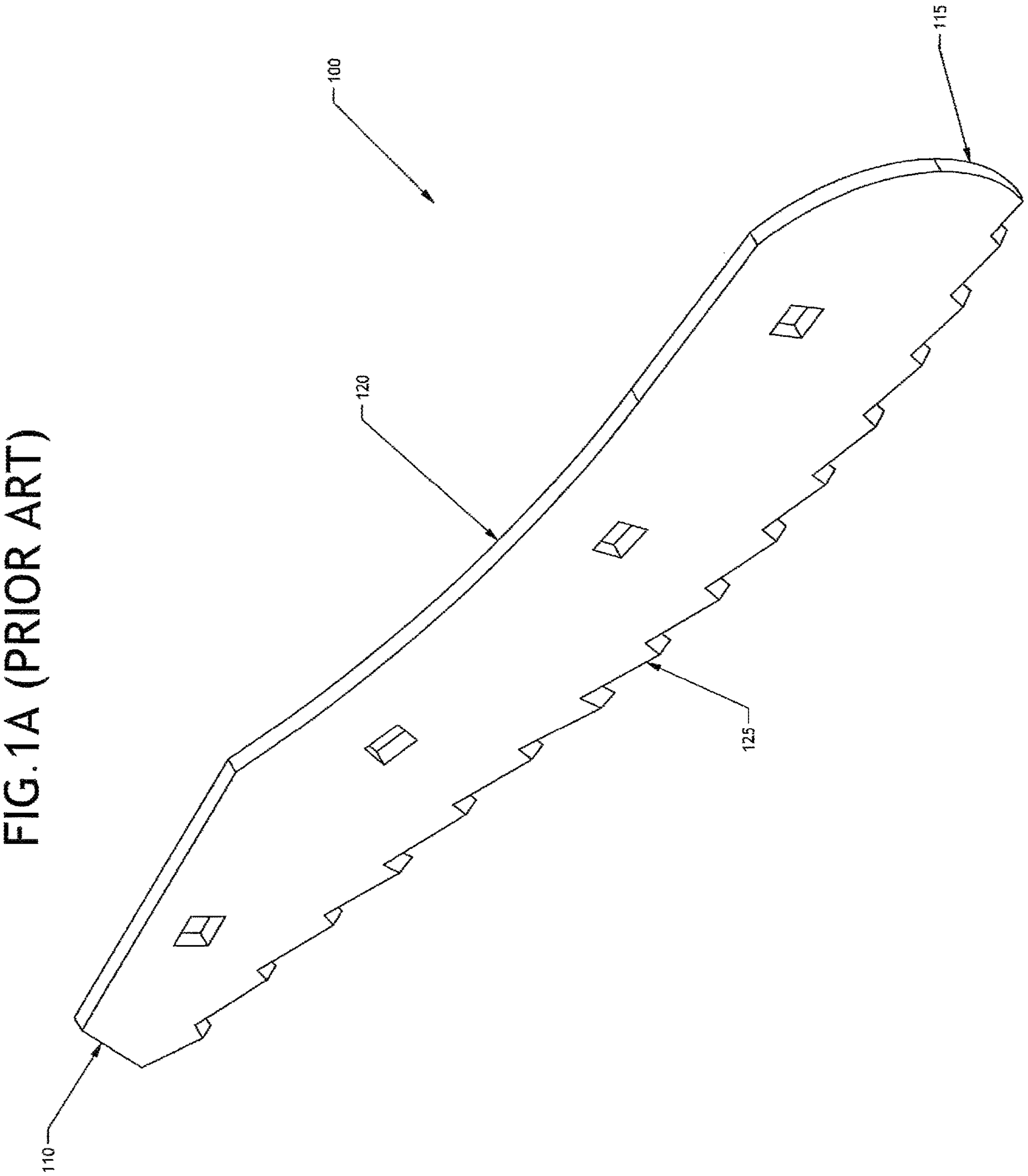
FIG.1A (PRIOR ART)
FIGS. 1A, 1B and 1C are isometric, side and elevated views of a prior art example of a knife for an auger.
Figure 1B:
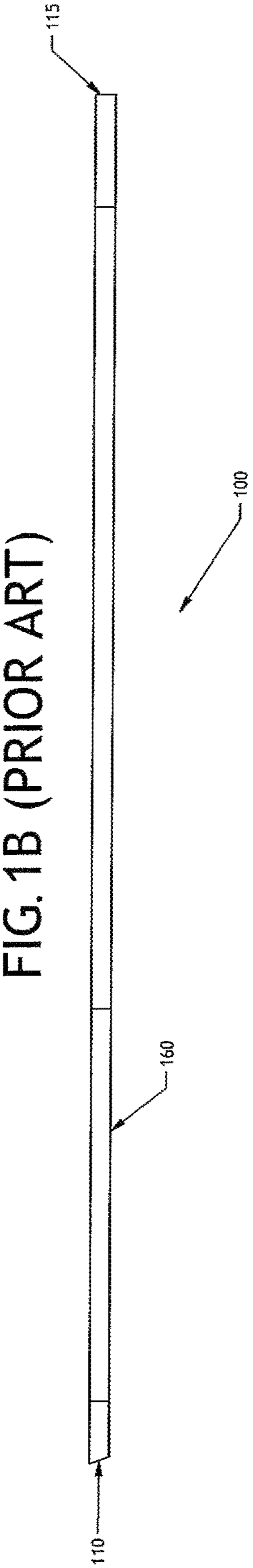
FIG. 1B (PRIOR ART)
Figure 1C:
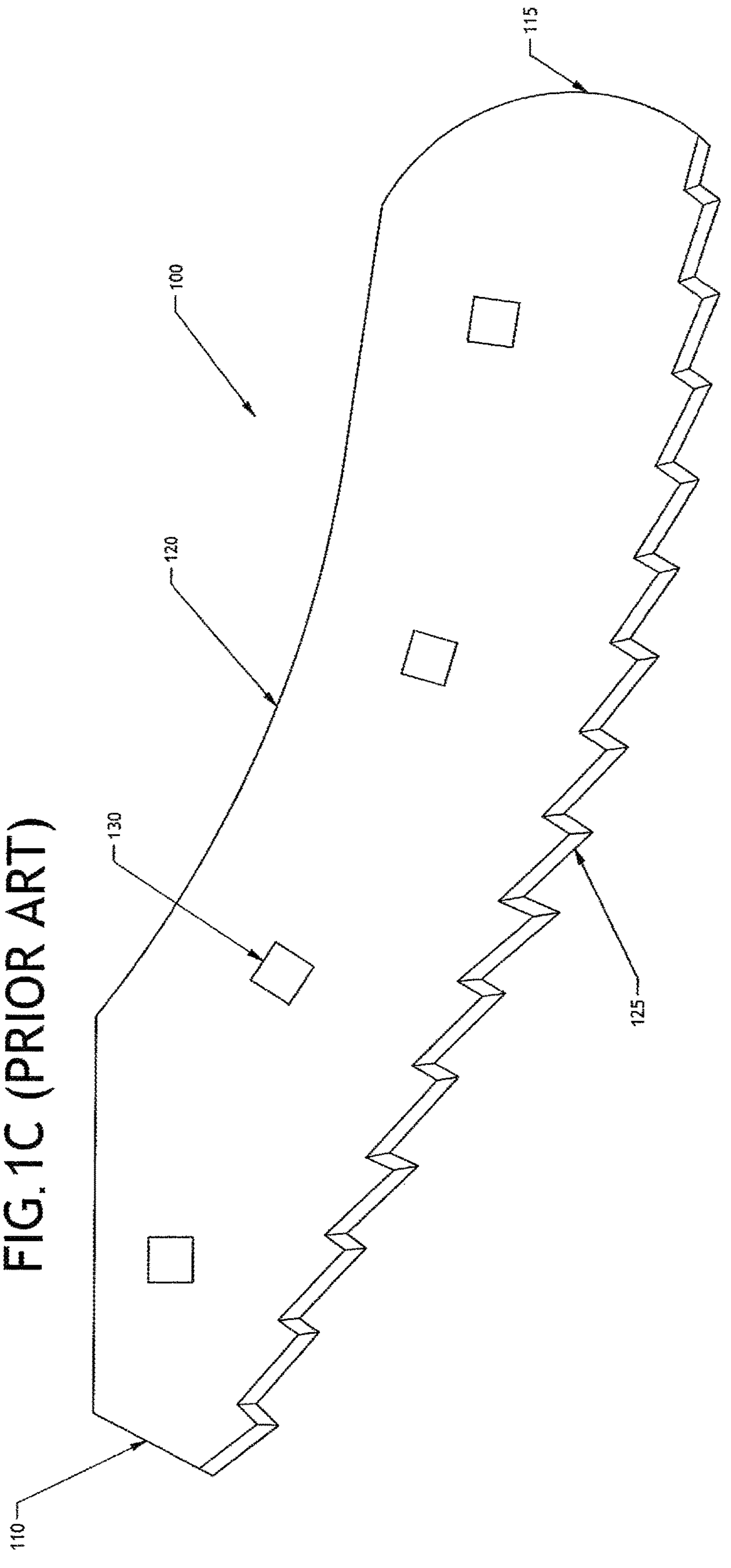
FIG. 1C (PRIOR ART)

FIGS. 1A to 1C show a conventional knife at 100 used on an auger for a vertical mixer for cutting bulk material, and typically bulk feed material. The knife 100 has an exterior cutting side 125 which is exposed to the bulk material during operation of the auger, a leading end 110 defined as the front end of the knife during regular operation of the auger and which would typically initially contact bulk material during normal operation of the auger and a trailing end 115 opposite the front end. An inboard side 120 is opposite the cutting side 125 and can include any suitable means or devices for use in mounting the knife 100 to the auger. As can be seen from the FIGS. 1A-1C the knife is generally flat.

Figure 2A:
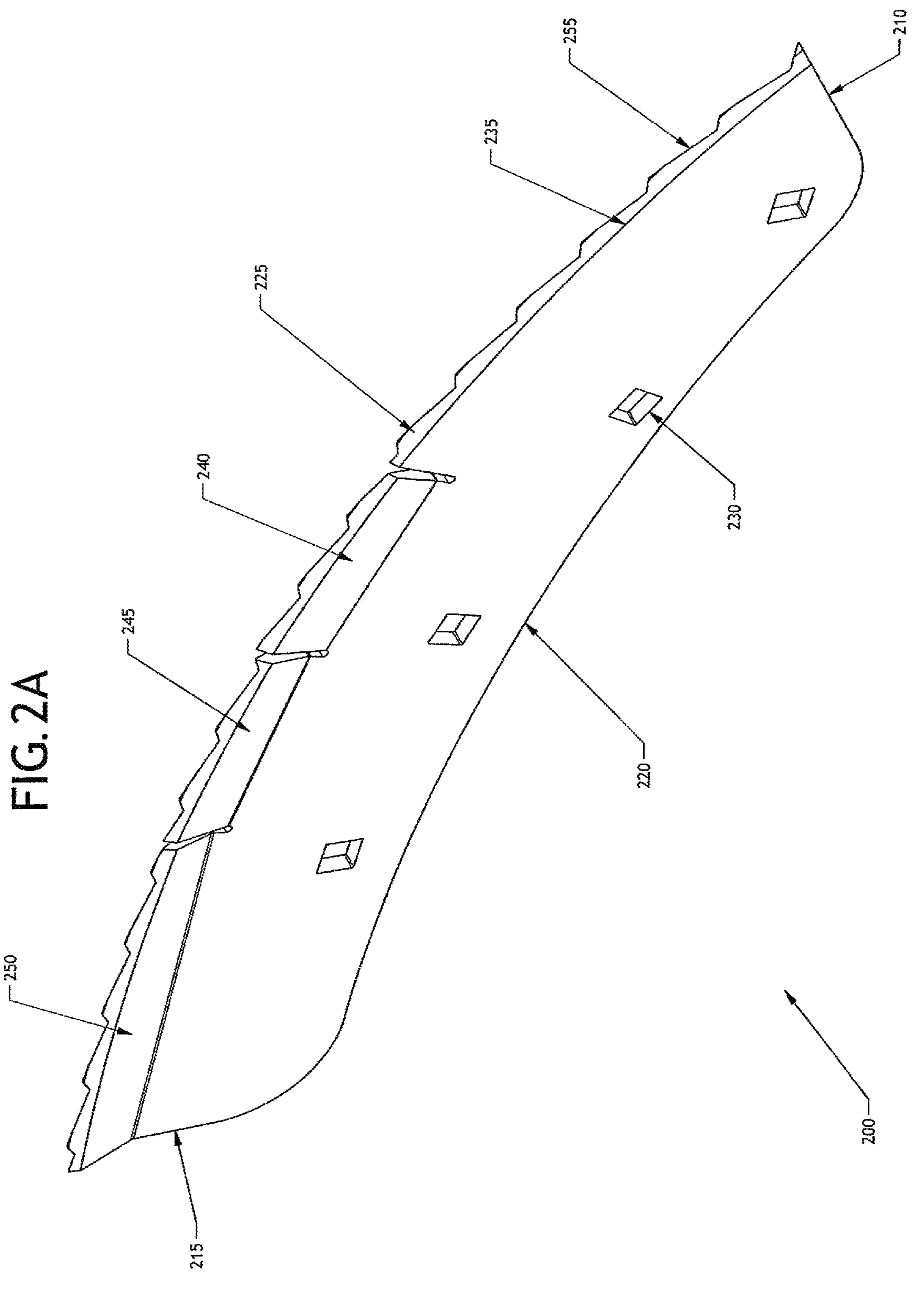
FIGS. 2A, 2B and 2C are isometric, side and top views of one illustrative embodiment of a knife for an auger according to one aspect of the present invention.
Figure 2B:
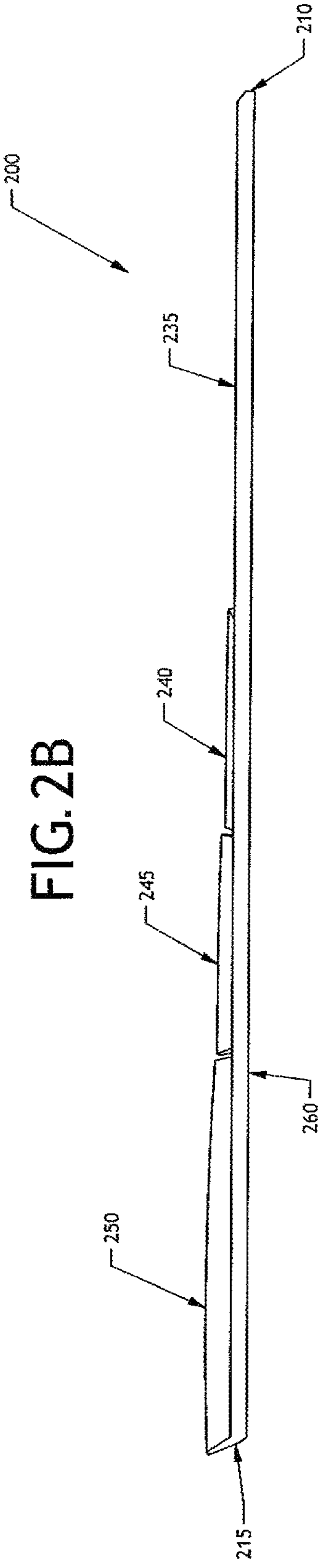
Figure 2C:
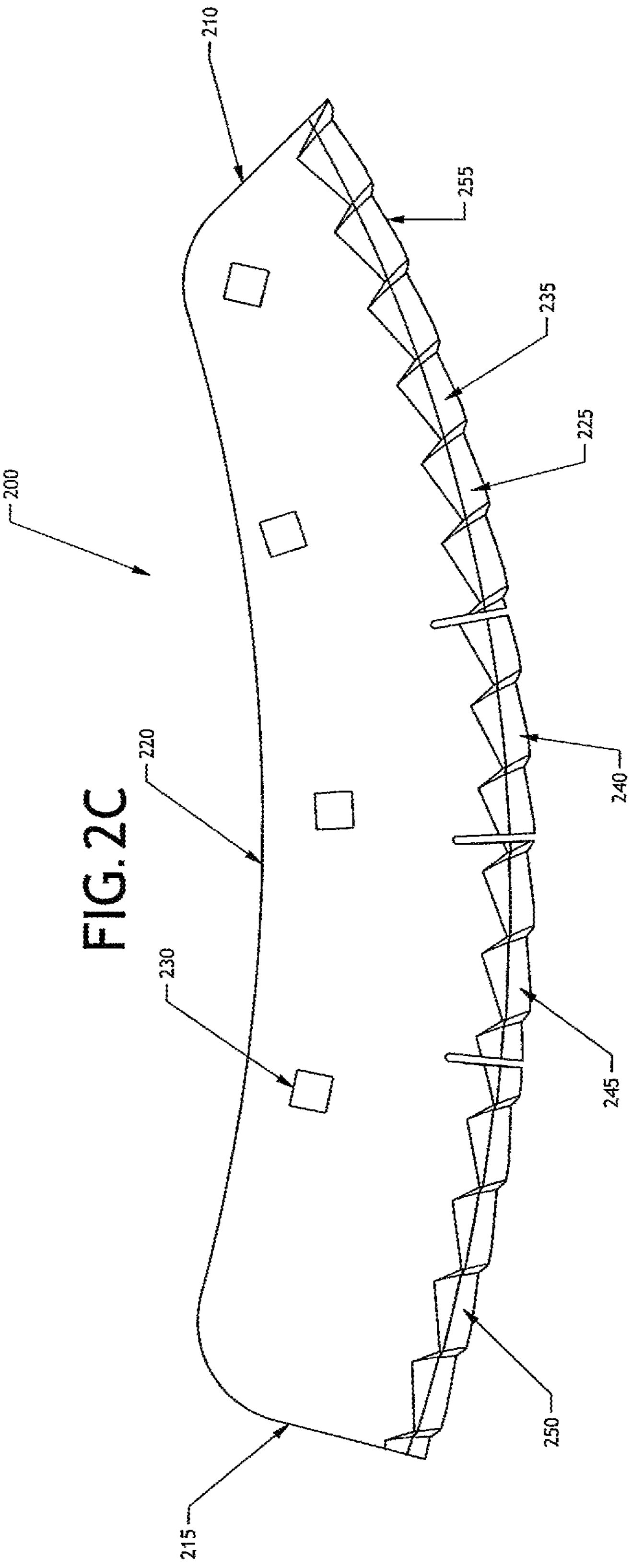

FIGS. 2A to 2C show one embodiment of a knife according to one aspect of the present invention shown generally at 200. The knife 200 has an exterior cutting side 225 which may include a blade edge 255 which may be optionally serrated. The cutting edge 225 is exposed to the bulk material when mounted to the flighting of a auger during operation of the auger. The knife 200 further includes a leading end 210 defined as the front end of the knife during regular operation of the auger to which it is mounted and which would typically initially contact bulk material during normal operation of the auger. The knife further includes a trailing end 215 opposite the leading end 210. An inboard side 220 is opposite the cutting side 225 and is used to mount the knife 200 to the auger, as shown in further detail for example in FIGS. 5A to 5C. For example, the inboard side 220 may include holes 230 for interfacing with or accommodating a corresponding connection device on the flighting of the auger.

The knife 200 includes an angled section 240 along a portion of the blade edge 255 angled upward from horizontal by an angle of X°. The knife 200 shown in FIGS. 2A-2C includes three angled sections 240, 245 and 250, but it will be appreciated that the knife may include one or more angled sections and the invention is not limited to knives comprising only three angled sections. The angled sections 240, 245 and 250 are along the cutting side 225 of the knife 200 and include the blade edge 255. The angled sections bend the blade edge 255 upward when mounted on a horizontal auger and present the blade edge 255 of the angled sections at an upward angle of X° to bulk material in the mixing chamber.

It will be appreciated that reference herein to horizontal is made as the knives of the present invention are typically designed for and may be used for mount on an auger for a vertical mixer and therefore the knives are oriented closer to horizontal than to a vertical orientation. It is not necessary that the knives be oriented perfectly level horizontally when mounted and it will be appreciated that the flighting of an auger for a vertical mixer is not level and horizontal but gradually cork screws upward. Reference to horizontal or an angle upward from horizontal is simply a reference to an angle out of plane and upward from the plane when the knife is oriented in a horizontal plane. Reference to the angle being upward from horizontal is not intended to be limiting and may be used interchangeably with an angle upwards from the longitudinal plane of the knife when the knife is oriented horizontally and upright. Reference to horizontal and an angle upwards from horizontal has been used herein in an effort to simplify explanation of the angles of the angled sections for the ease of the reader.

In one embodiment, each of the angled sections 240, 245 and 250 of the knife 200 may have a different angle upward from horizontal. Optionally, each angled section may be bent more upwards relative the proximity to the trailing end 215 of the knife 200. For example, the angled section 250 which is at the trailing end 215 may be bent more upwards than the adjacent angled section 245 positioned toward the leading edge 210 which may be bent more upward than the adjacent angled section 240 positioned even more toward the leading edge 210. The most forward section 235 may be flat and not angled upward from horizontal.

It will be appreciated that the angled sections 240, 245 and 250 may be integrated together into one larger angled section that includes a gradually increasing angle toward the trailing end 215. Such an integrated angled section is shown with reference to FIGS. 6A-6G in more detail.

As with conventional knives, the inboard side 220 can include any suitable mounting holes or brackets 230 for mounting the knife 200 to an auger using any suitable mounting technique.

Optionally, a protecting coating may be applied to various portions of the knife 200. For example, a tungsten carbine coating may be applied to lengthen the operational life of the knife 200 and to reduce maintenance. The coating may be applied to an underside 260 of the knife 200.

Figure 3A:
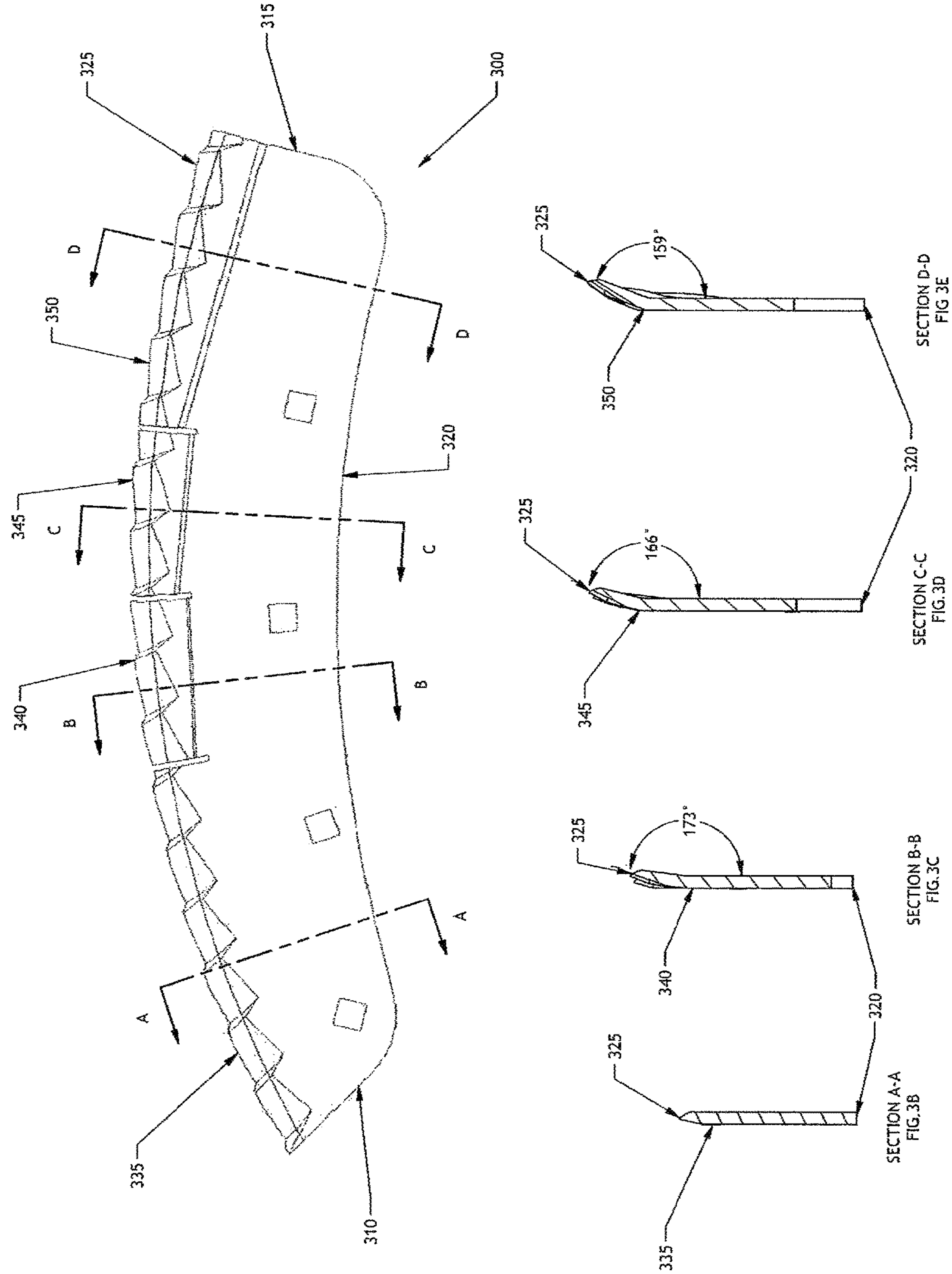
FIG. 3A is a top view of one illustrative embodiment of a knife for an auger according to one aspect of the present invention with cross-sectional identifiers A-A, B-B, C-C and D-D.

FIGS. 3A to 3E show an embodiment of a knife 300 of the invention with varying degrees of angle of the angled sections 340, 345 and 350 shown in more detail in the cross-sectional views along A-A (FIG. 3B), B-B (FIG. 3C), C-C (FIG. 3D) and D-D (FIG. 3E). The knife 300 includes the leading end 310 opposite the trailing end 315 and includes the exterior cutting side 325 opposite the inboard side 320. The cutting side 325 includes the angled sections 340, 345 and 350 each positioned adjacent each other and having and angle above horizontal which increases for each section as it is positioned closer to the trailing end 315. For example, the leading end section 335 has no angle upward from horizontal, the first angled section 340 has an angle of about 7° upward from horizontal (X) also referred to as an obtuse angle of about 173°. For the purposes of this disclosure, both references may used and are interchangeable as they represent the same degree of bend in the angled section. The second angled section 345 has an angle X of about 14° upward from horizontal also referred to as an obtuse angle of about 166°. The most aft angled section 350 has an angle X of about 21° upward from horizontal also referred to as an obtuse angle of about 159°.

Figures 4A, 4B, 4C, 4D, 4E:
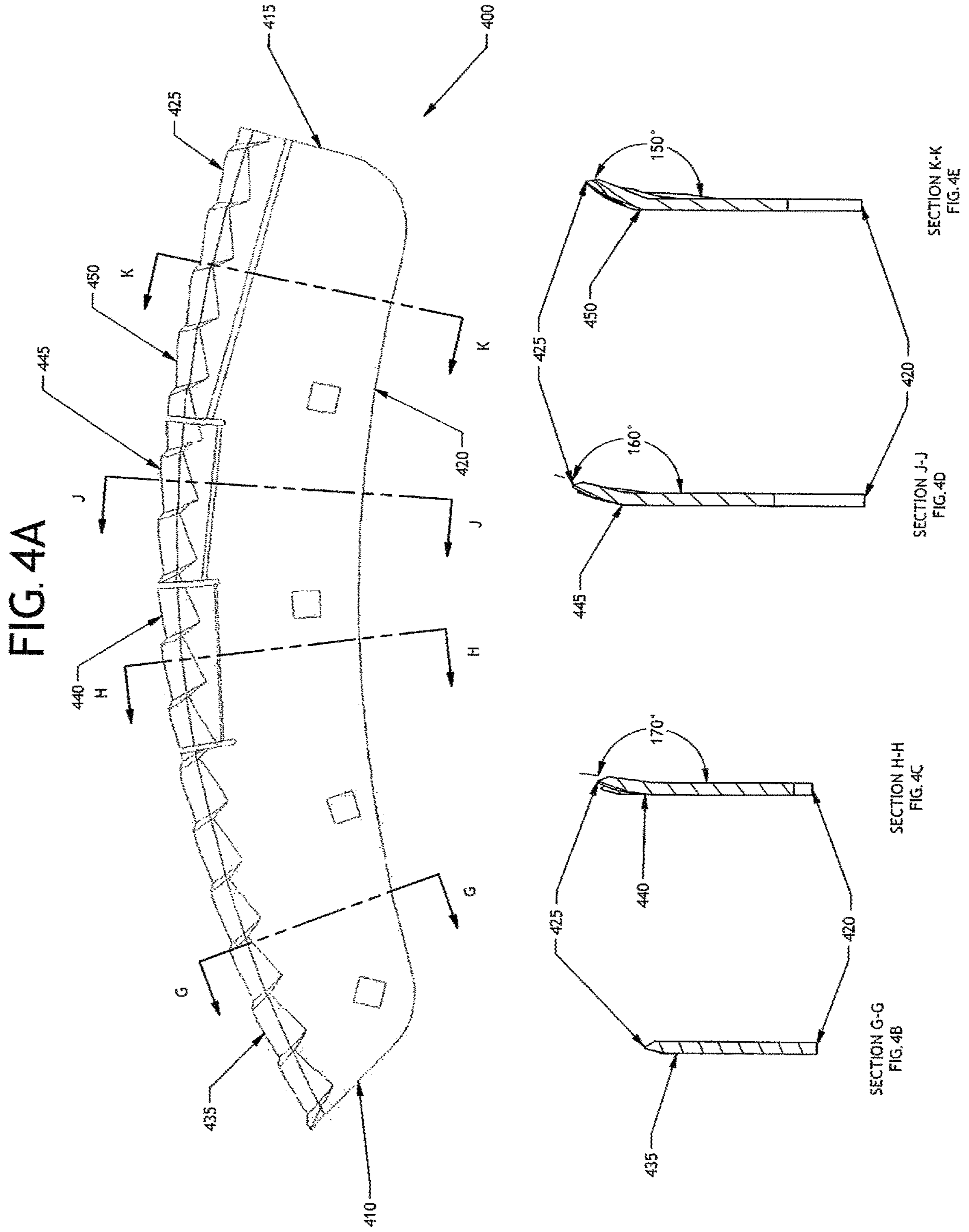
FIG. 4A is a top view of another illustrative embodiment of a knife for an auger according to another aspect of the present invention with cross-sectional identifiers G-G, H-H, J-J and K-K.
FIG. 4B is a cross-section view taken along G-G.
FIG. 4C is a cross-sectional view taken along H-H.
FIG. 4D is a cross-sectional view taken along J-J.
FIG. 4E is a cross-sectional view taken along K-K.

FIGS. 4A to 4E show an embodiment of a knife 400 of the invention with varying degrees of angle of the angled sections 440, 445 and 450 shown in more detail in the cross-sectional views along G-G (FIG. 4B), H-H (FIG. 4C), J-J (FIG. 4D) and K-K (FIG. 4E). The knife 400 includes the leading end 410 opposite the trailing end 415 and includes the exterior cutting side 425 opposite the inboard side 420. The cutting side 425 includes the angled sections 440, 445 and 450 each positioned adjacent each other and having and angle above horizontal which increases for each section as it is positioned closer to the trailing end 415. For example, the leading end section 435 has no angle upward from horizontal, the first angled section 440 has an angle of about 10° upward from horizontal (X) also referred to as an obtuse angle of about 170°. For the purposes of this disclosure, both references may used and are interchangeable as they represent the same degree of bend in the angled section. The second angled section 445 has an angle X of about 20° upward from horizontal also referred to as an obtuse angle of about 160°. The most aft angled section 450 has an angle X of about 30° upward from horizontal also referred to as an obtuse angle of about 150°.

Figure 6A:
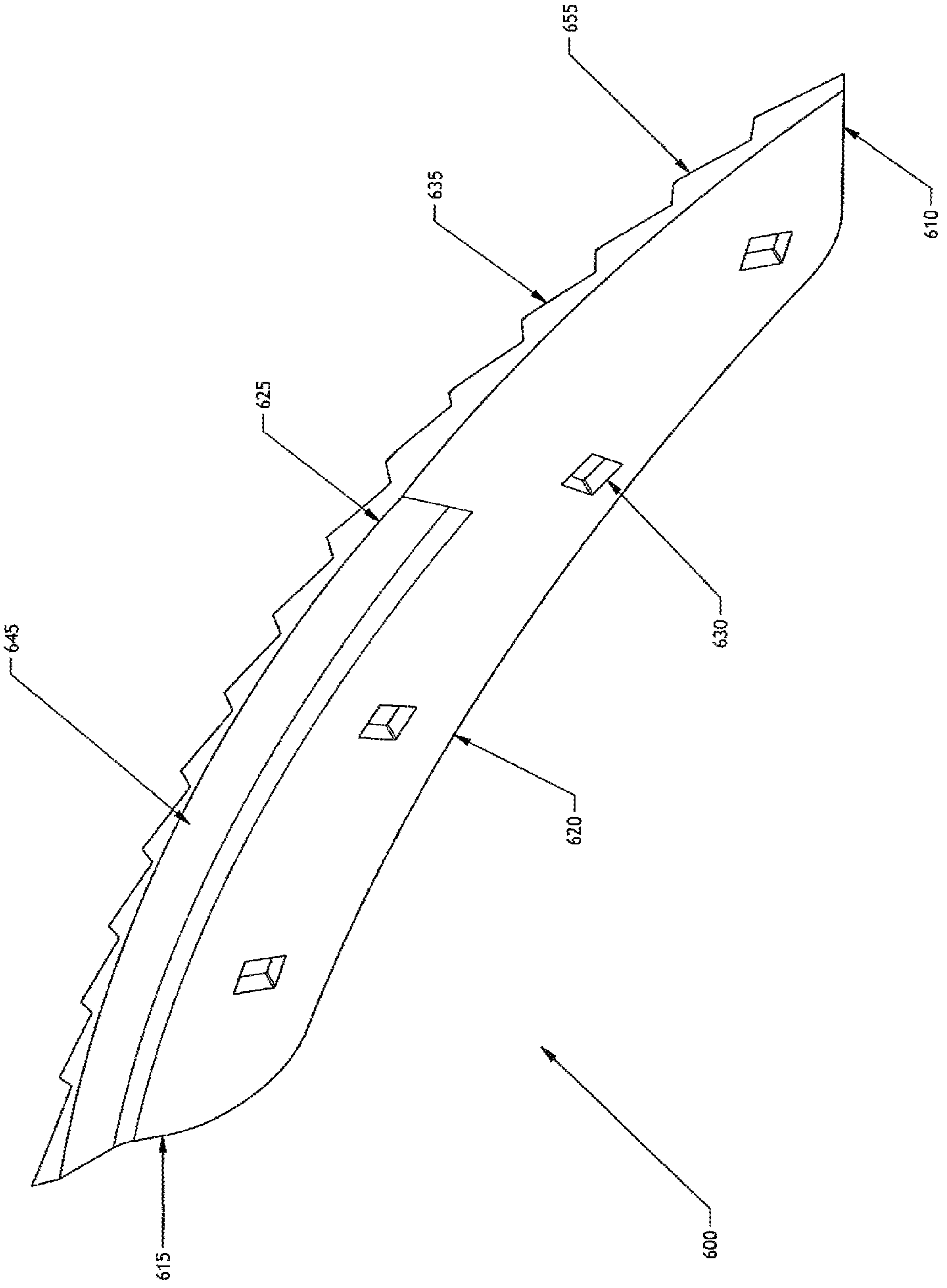
FIG. 6A is an isometric view of one illustrative embodiment of a knife for an auger according to another aspect of the present invention.
Figures 6B, 6C:
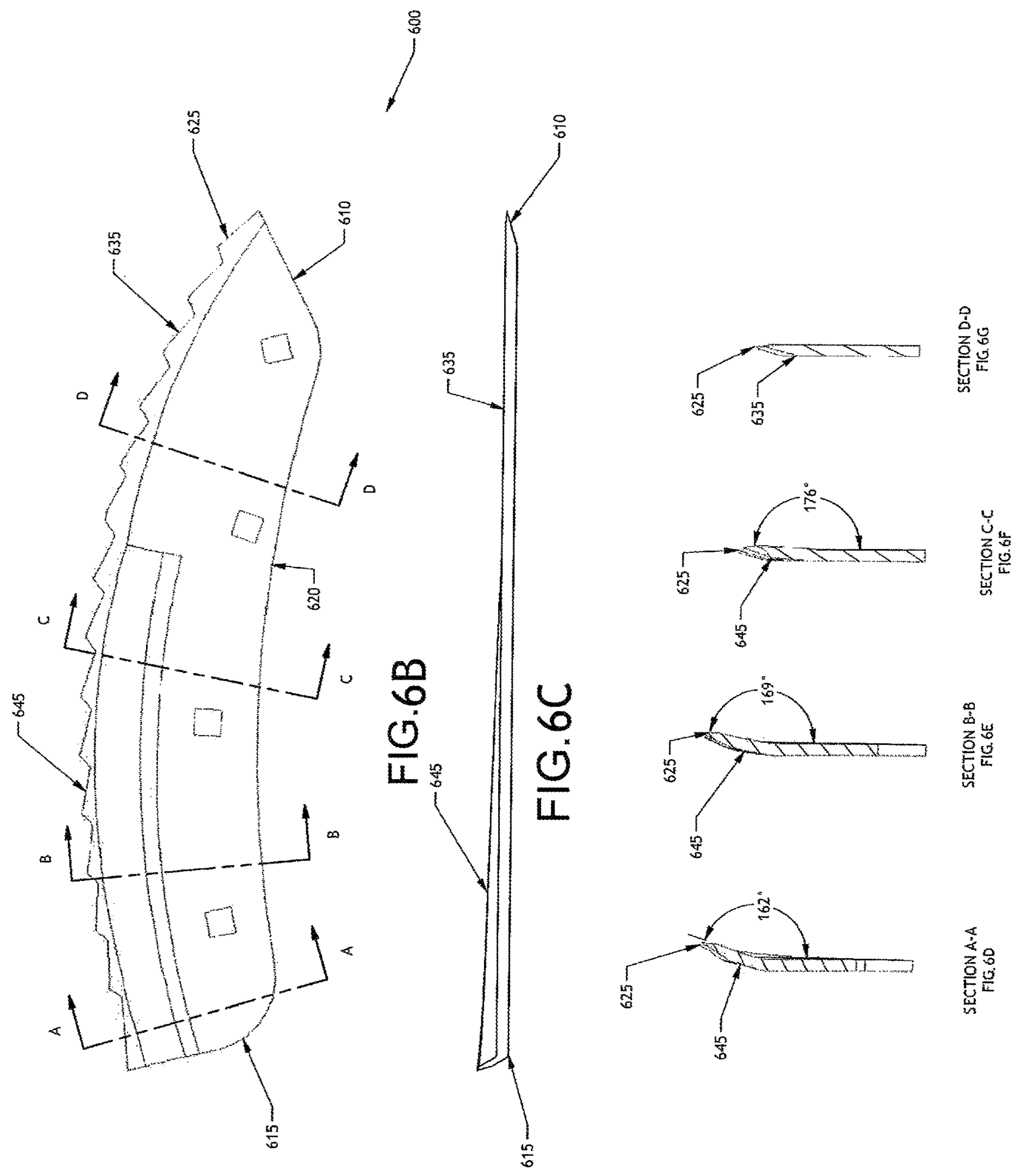
FIG. 6B is a top view of the illustrative embodiment of a knife for an auger as shown in FIG. 6A with cross-sectional identifiers A-A, B-B, C-C and D-D.
FIG. 6C is a side view of the illustrative embodiment of a knife for an auger as shown in FIG. 6A.

FIGS. 6A to 6G show an embodiment of a knife 600 of the invention with an integrated angled section 645 having varying degrees of angle shown in more detail in the cross-sectional views along A-A (FIG. 6D), B-B (FIG. 6E), C-C (FIG. 6F) and D-D (FIG. 6G). The knife 600 includes the leading end 610 opposite the trailing end 615 and includes the exterior cutting side 625 opposite the inboard side 620. The cutting side 625 includes the angled section 645 having a gradually increasing angle above horizontal which increases as the section moves from the leading end 610 toward the trailing end 615. For example, the leading end section 635 has no angle upward from horizontal, while the angled section begins with no angle upward and gradually increases in angle upward to over 18° upward from horizontal (X) also referred to as an obtuse angle of about 162°. For the purposes of this disclosure, both references may used and are interchangeable as they represent the same degree of bend in the angled section. It is also contemplated that the integrated angled section 645 may gradually decrease at various portions or have a consistent angle at various portions thereof.

Figure 7A:
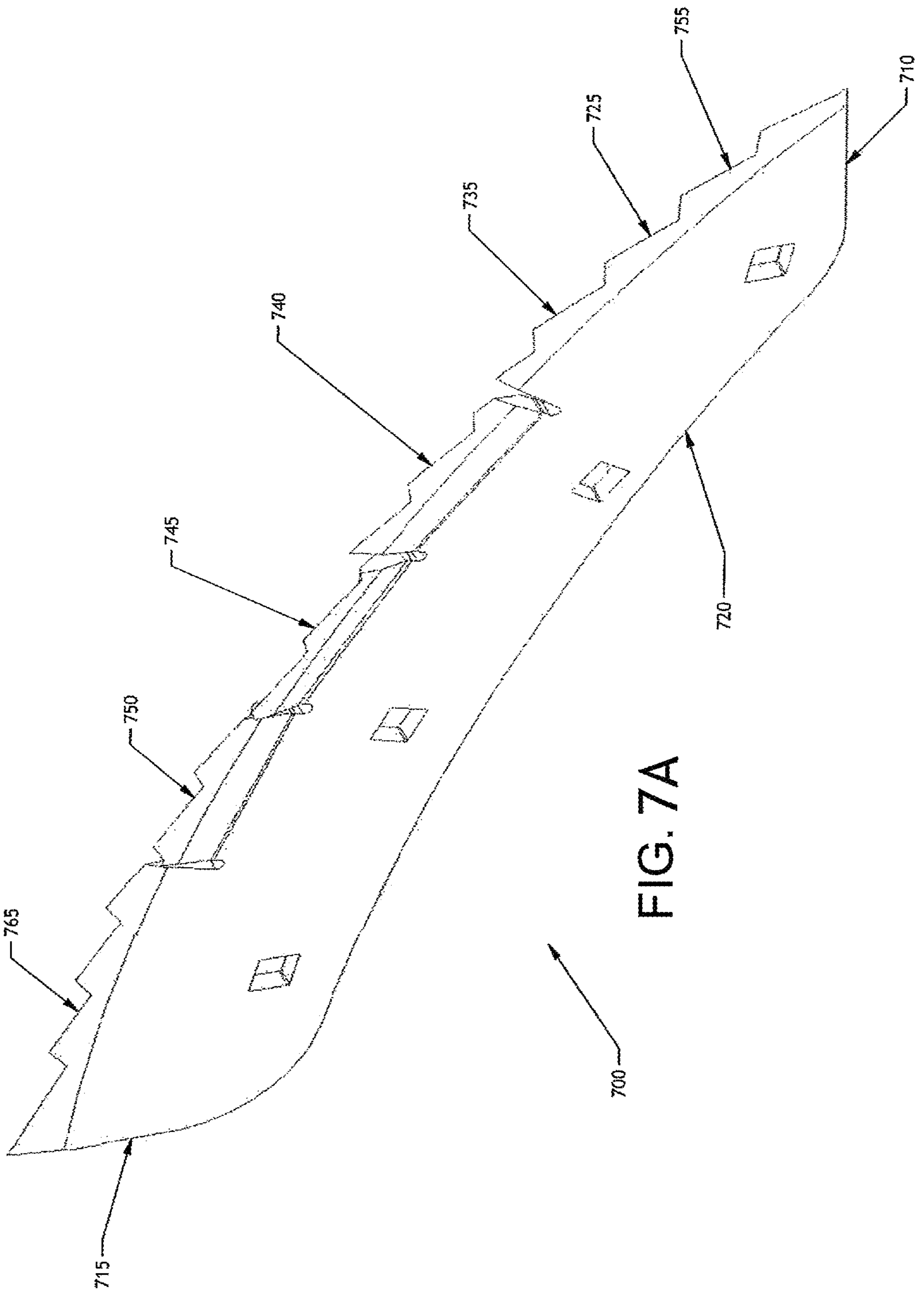
FIG. 7A is an isometric view of one illustrative embodiment of a knife for an auger according to another aspect of the present invention.
Figures 7B, 7C:
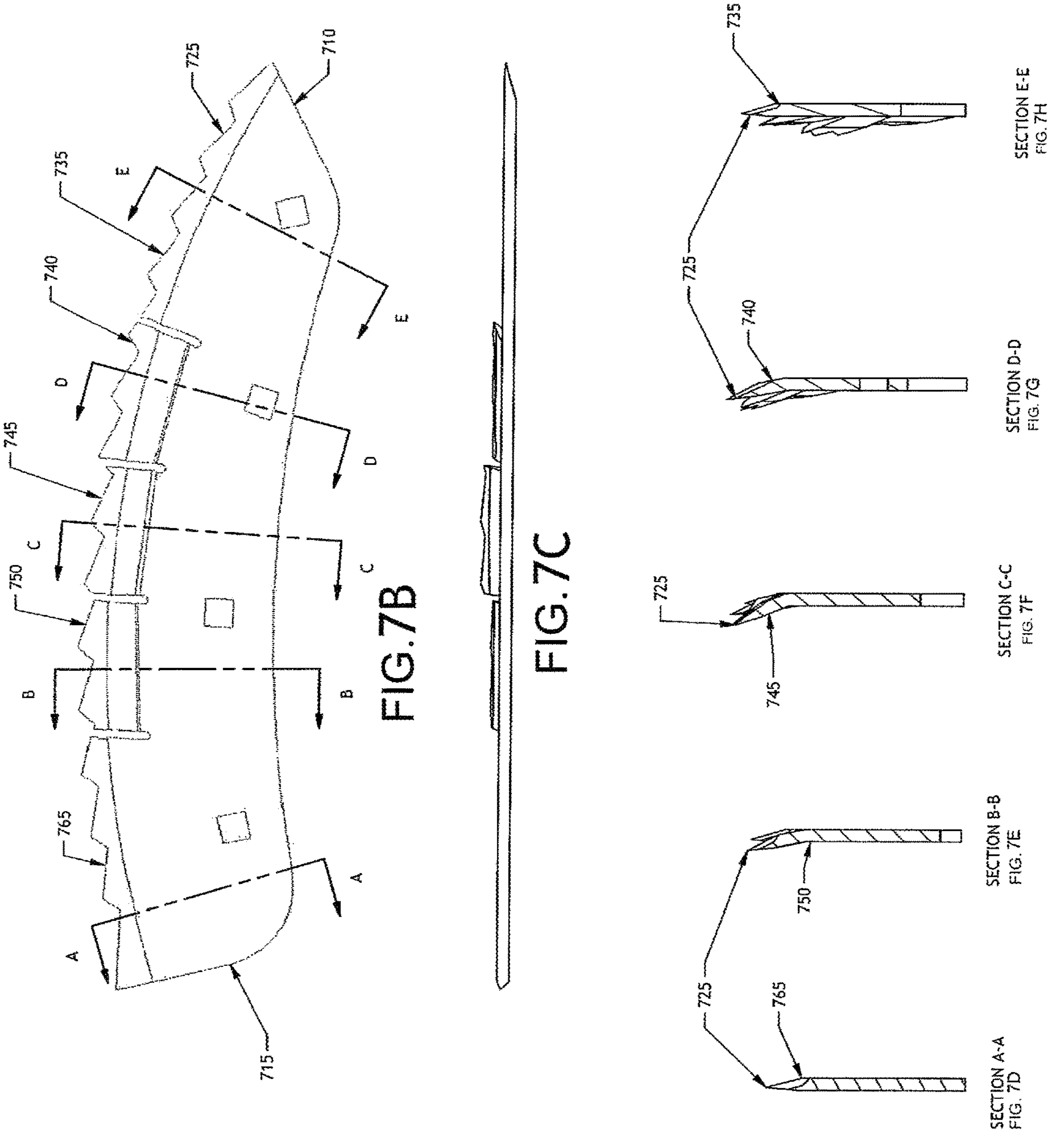
FIG. 7B is a top view of the illustrative embodiment of a knife for an auger as shown in FIG. 7A with cross-sectional identifiers A-A, B-B, C-C, D-D and E-E.
FIG. 7C is a side view of the illustrative embodiment of a knife for an auger as shown in FIG. 7A.

FIGS. 7A to 7H show an embodiment of a knife 700 of the invention with varying degrees of angle of the angled sections 740, 745 and 750 shown in more detail in the cross-sectional views along A-A (FIG. 7D), B-B (FIG. 7E), C-C (FIG. 7F), D-D (FIG. 7G) and E-E (FIG. 7H). The knife 700 includes the leading end 710 opposite the trailing end 715 and includes the exterior cutting side 725 opposite the inboard side 720. The exterior cutting side 725 may include a blade edge 755. The cutting side 725 includes the angled sections 740, 745 and 750 each positioned adjacent each other and having and angle above horizontal which increases between section 740 and 745 but decreases between the middle section 745 and the more trialing section 750. For example, the leading end section 735 has no angle upward from horizontal, the first angled section 740 has a slight angle upward from horizontal (X) also referred to as an obtuse angle. The second angled section 745 has a greater angle upward from horizontal and is the most angled of the angled sections. The most aft angled section 750 has a slight angle upward from horizontal but which is less than the middle section 745. The most aft section proximate the trailing end 715 has no angle from horizontal.

Figures 8A, 8B, 8C, 8D, 8E, 8F:
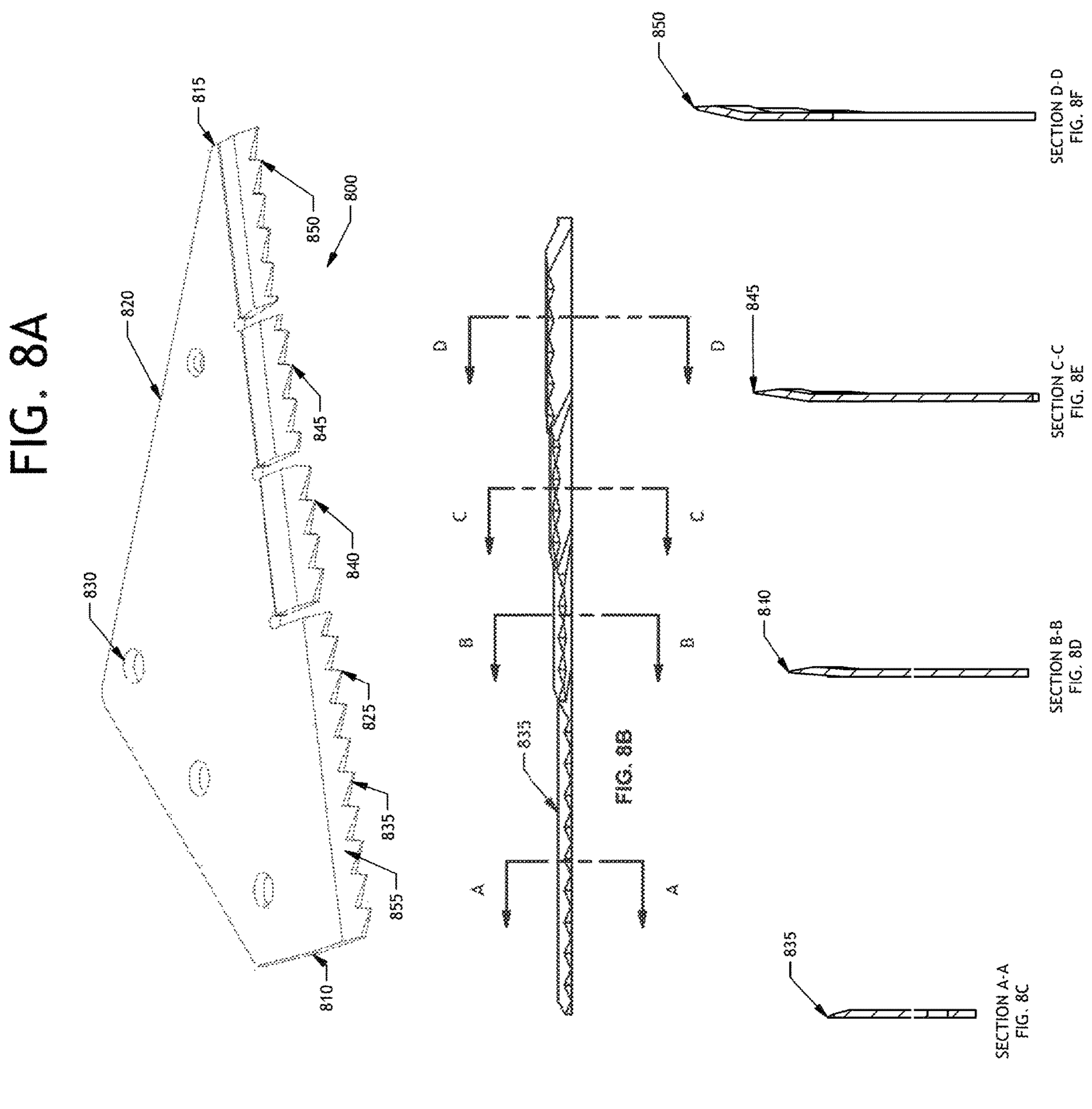
FIG. 8A is an isometric view of one illustrative embodiment of a knife for an auger according to another aspect of the present invention.
FIG. 8B is a side view of the illustrative embodiment of a knife for an auger as shown in FIG. 8A with cross-sectional identifiers A-A, B-B, C-C and D-D.
FIGS. 8C to 8F are cross-sectional views taken along A-A, B-B, C-C and D-D, respectively.

FIGS. 8A to 8F show an embodiment of a knife 800 of the invention with varying degrees of angle of the angled sections 840, 845 and 850 shown in more detail in the cross-sectional views along A-A (FIG. 8C), B-B (FIG. 8D), C-C (FIG. 8E), and D-D (FIG. 8F). The knife 800 includes the leading end 810 opposite the trailing end 815 and includes the exterior cutting side 825 opposite the inboard side 820. The inboard side 820 may include holes 830 for interfacing with or accommodating a corresponding connection device on the flighting of the auger. The exterior cutting side 825 may include a blade edge 855. The cutting side 825 includes the angled sections 840, 845 and 850 each positioned adjacent each other and having and angle above horizontal which increases between section 840 and 845 and again between the middle section 845 and the more trialing section 850. For example, the leading end section 835 has no angle upward from horizontal, the first angled section 840 has a slight angle upward from horizontal (X) also referred to as an obtuse angle. The second angled section 845 has a greater angle upward from horizontal. The most aft angled section 850 has the greatest angle upward from horizontal.

Figure 9A:
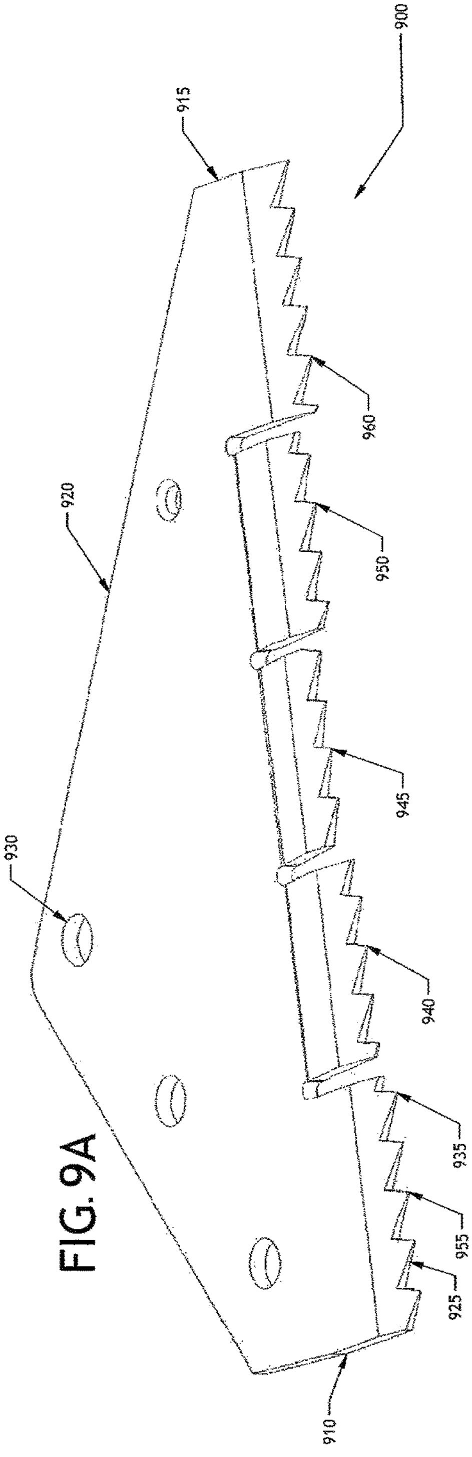
FIG. 9A is an isometric view of one illustrative embodiment of a knife for an auger according to another aspect of the present invention.
Figure 9B:
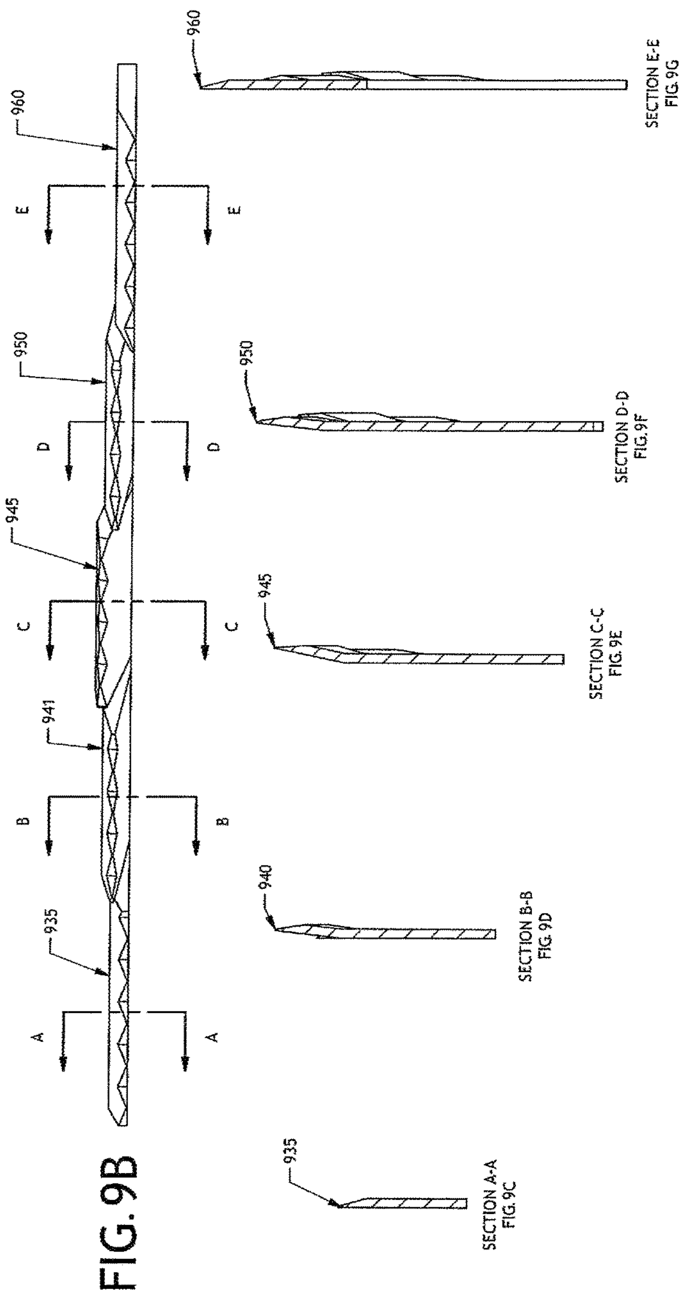
FIG. 9B is a side view of the illustrative embodiment of a knife for an auger as shown in FIG. 9A with cross-sectional identifiers A-A, B-B, C-C, D-D and E-E.

FIGS. 9A to 9G show an embodiment of a knife 900 of the invention with varying degrees of angle of the angled sections 940, 945 and 950 shown in more detail in the cross-sectional views along A-A (FIG. 9C), B-B (FIG. 9D), C-C (FIG. 9E), D-D (FIG. 9F) and E-E (FIG. 9G). The knife 900 includes the leading end 910 opposite the trailing end 915 and includes the exterior cutting side 925 opposite the inboard side 920. The inboard side 920 may include holes 930 for interfacing with or accommodating a corresponding connection device on the flighting of the auger. The exterior cutting side 925 may include a blade edge 955. The cutting side 925 includes the angled sections 940, 945 and 950 each positioned adjacent each other and having and angle above horizontal which increases between section 940 and 945 but decreases between the middle section 945 and the more trialing section 950. For example, the leading end section 935 has no angle upward from horizontal, the first angled section 940 has a slight angle upward from horizontal also referred to as an obtuse angle. The second angled section 945 has a greater angle upward from horizontal and is the most angled of the angled sections. The most aft angled section 950 has a slight angle upward from horizontal but which is less than the middle section 795. The most aft section 960 proximate the trailing end 915 has no angle from horizontal.

As can be appreciated, the knives of the present invention may be curved knives such as those shown with reference to FIGS. 1-7 or they may be straight knives such as those shown with reference to FIGS. 8 and 9. There is no limitation on the shape of the knife that may be used or applied with the concepts of the invention.

It is contemplated that an angle upward of up to 90° may be used and effectively cut material while reducing cut time. It is also contemplated that the entire cutting side may comprise of angle sections or a single gradual angled section or a single angled section, that spans the entire length of the cutting side.

Figure 5A:
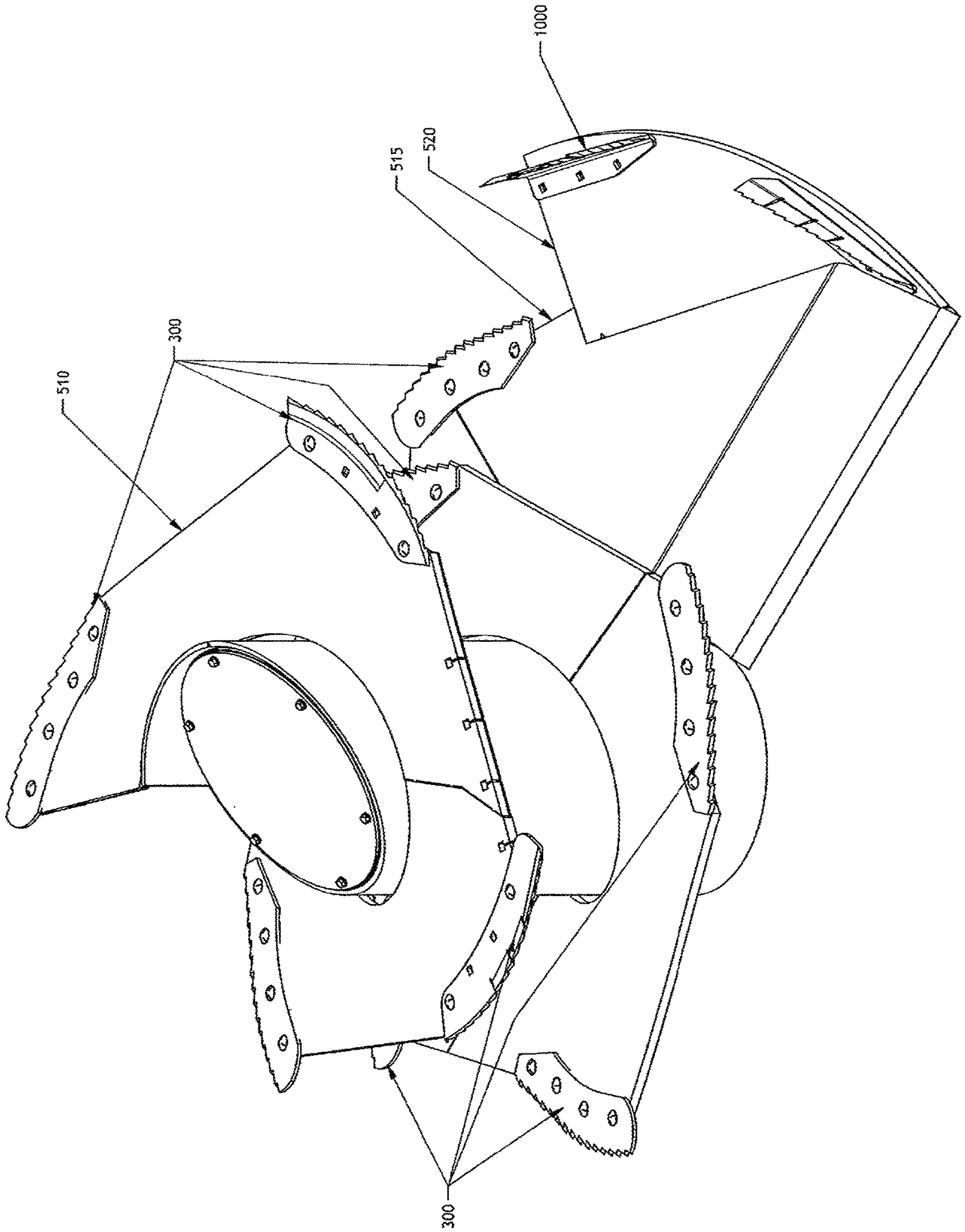
FIG. 5A is an isometric view of one embodiment of a knife for an auger mounted on the flighting of an auger.
Figure 5B:
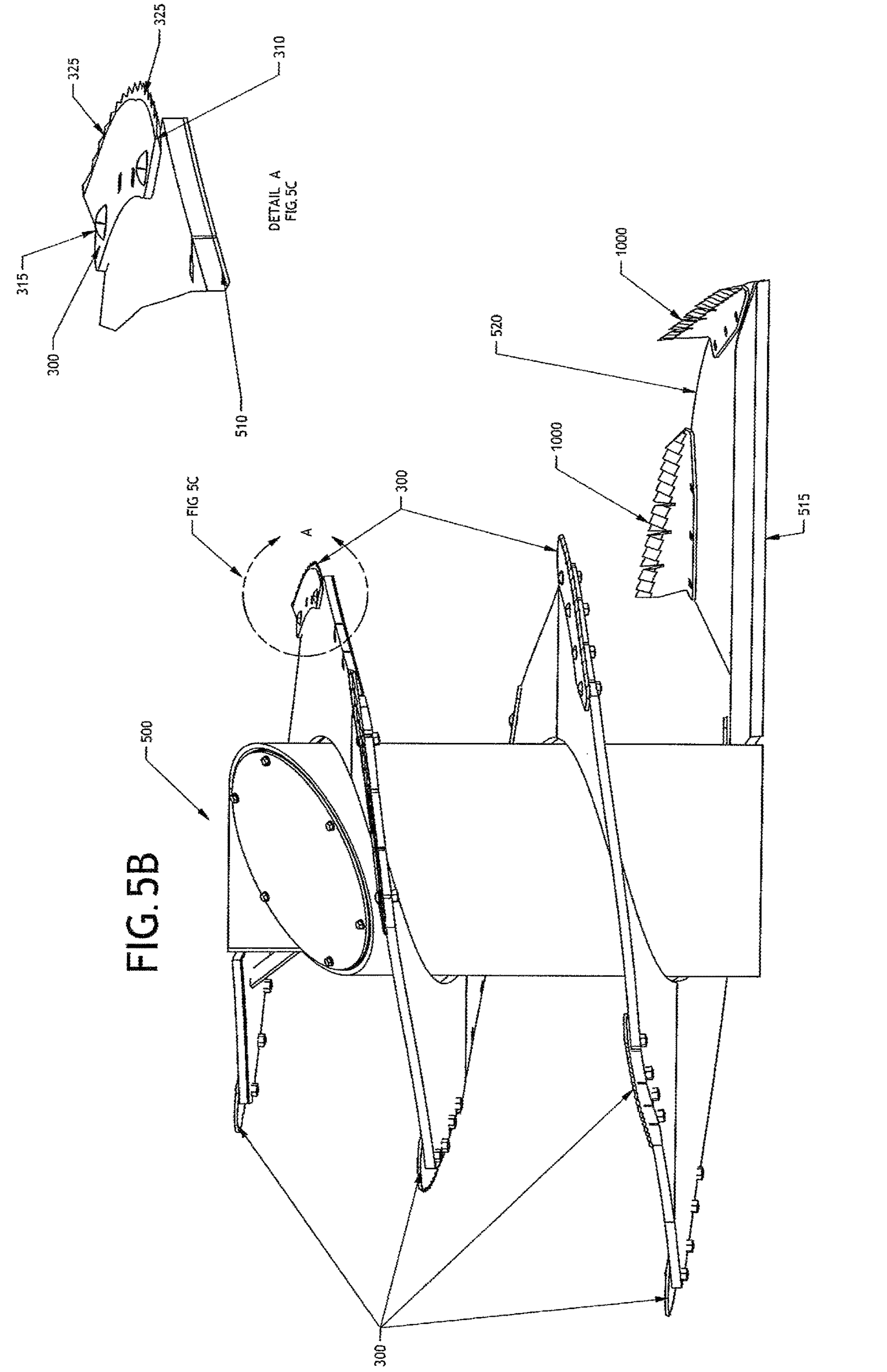
FIG. 5B is a side view of the knife for an auger mounted on the flighting of an auger as shown in FIG. 5A.

FIGS. 5A to 5B show an embodiment of one knife according to the invention (as described for example with reference to FIGS. 3A-3E) shown at 300 mounted to an auger 500 for a vertical mixer. FIGS. 5A and 5B show a side view and an exploded view, respectively, which illustrate the upward bend in the angled sections of the knife 300. It can be seen that the knife 300 has the angled sections which position portions of the blade edge at an upward angle to bulk material which would come into contact thereto during normal operation of the auger 500.

During rotation of the auger 500 bulk material moves upward along certain portions of the auger 500 as a result of rotation of the auger 500 and the pitch of the flighting 510. The material also moves downward along other outer portions of the auger 500. The upward angled sections of the knife 300 appear to cut the material more efficiently allowing for a reduction in cut time as compared to a conventional flat knife.

The auger 500 also includes a bottom flight 515 on the flighting 510 to which a base knife 1000 is mounted directly or indirectly thereto. The auger 500 may include a trailing wing 520 or trailing blade fixed or incorporated into to the bottom flight 515 and onto which may be mounted a base knife 1000. In such a situation, the base knife 1000 would be considered to be indirectly mounted to the bottom flight 515 of the auger 500. Base knives are contemplated by the inventors and are described in more detail with reference to FIGS. 10A-10F.

Test Results

Test 1

TABLE 1

| Test results of Test 1 | |
|---|---|
| Machine model/Serial: | 2575 Jaylor Vertical Feed Mixer |
| Date of test: | 7 Jan. 2020 |
| Description of mixing chamber components: (include knife configuration, auger type, door configuration, as well as description and location of any damaged, overly worn, or altered components) | The Auger of the mixer was equipped with all knifes, minus the vertical and alexander knifes. The knifes where the new design of the knife with the tip of the blade going from 0 degrees relative to the auger flight, to 20 degrees relative to the auger flight. The tungsten carbide was added to the underside of the knife, compared to on top of the knife for better wear ability. |
| Description of test: (include feed components, weight of each component, time when each component was added, total feed weight, approximate average and maximum auger power draw if possible, total mix time, moisture content, ambient temperature, auger rotational speed, etc) | The purpose of this test was to determine how these knifes worked for cutting material. We figure that these knifes will work better and be more aggressive for cutting. We did several tests adding a total of 3 bales to the mixer per mix. 2 bales where added to the mixer, the mixer was then started. After 5 min, the third bale was added. Bales where mostly Timothy grass with a bit of alfalfa and brome. |
| Results: (Timeline observations on quality of mix from start to finish and unload afterwards. Note time and location of changes to mix quality. Record total time of unload.) | The cut time on the initial test was faster than the standard knifes. Horse Power: Regular Knives: 22.5 HP average, 36 HP Max New Knives: 24.5 HP average, 36 HP Max Cut Times: from the time the mixer was started. Hay: Regular knives: 18.5 min average cut time New knives: 11 min average cut time |

The tests carried out show that using a knife according to the present invention reduced mix/cutting time from 18.5 minutes to 11 minutes as compared to a conventional flat knife when mixing an exemplary feed mix under mix conditions which are representative of typical mix conditions.

Test 2

Objective: To compare the processing and mixing efficiency of the Jaylor Wing-knife, also referred to as an angled knife, with that of the current Flat-knife in a Jaylor 6850 operating on the Armstrong Dairy farm, by monitoring power use, total fuel consumption, mix particle size distribution and milk production and composition during one full week of operation with each type of knife fitted in the mixer.

Procedure: The trial was conducted on the Armstrong Manor dairy farm which was comprised of 335 lactating cows and associated calves, growing heifers and dry cows. All feed for the farm was batched and fed-out using a new Jaylor 6850, twin-auger vertical TMR mixer, without the use of Alexander or vertical knives.

The trial was designed to consist of two, approximately two-week periods, about four weeks in total, with the first week of each period to be used for machinery set-up (i.e. knife changes) and dietary adaptation by the animals, and the second week used for data collection. The realized timeline of the trial is given in Table 1.

The trial initially started with the installation of new Flat knives on Mar. 19, 2021, and progressed with installation of the Wing-knives on April 2. On April 5, the quality of the round bale hay changed to a significantly coarser hay, so it was decided to restart the trial as of that day and add a second Flat-knife period after the Wing-knife period was completed. The data from the first Flat-knife period was subsequently not included in this report.

Each trial period started with the installation of the knives to be tested, with data collection being conducted over one week, starting Friday, April 9 for the Wing-knives, and April 23 for the Flat knives (Table 2). This resulted in a 4-day adaptation period in each case, 3 days less than the targeted 7-day adaptation.

TABLE 2

Timeline of the Armstrong Manor knife trial.

| Date(s) | Event |
|---|---|
| Period 1: Wing-knives | |
| April 2 | Installed new Wing-knives |
| April 5 | Change of hay quality (delay) |
| April 9 | Start milk and fuel consumption data collection |
| April 13 | Torque metering and ration particle size data collection |
| April 15 | End of milk data collection |
| Period 2: Flat knives | |
| April 19 | Installed new Flat-knives |
| April 23 | Start milk and fuel consumption data collection |
| April 27 | Torque metering and ration particle size data collection |
| April 29 | End of milk data collection |
| End of Trial | |
| May 3 | Reinstalled original Armstrong knives |

In roughly the middle of each data collection week, the mixer was fitted with a PTO torque meter for one load of lactating ration to measure power consumption. Then, 10 equally spaced, approximately 280-gram (one liter) samples of the entire batch of lactating ration were taken from the feed alley, as soon as possible after the ration was fed, for determination of particle size distribution using a Jaylor Shaker Box.

The mixer operator monitored the amount of fuel used during a defined time period within each data collection period, as well as provided a summary of the milk production and composition records for the 7 days of each data collection period.

During the entire trial, it was attested that all parameters such as numbers of animals being fed, numbers of cows being milked, ration formulations, and miscellaneous use of the tractor running the TMR mixer remained relatively constant. Throughout the experiment the mixer operator was encouraged to minimize the processing and mixing time required to achieve the desired mix.

Results:

The composition of the lactating ration that was batched during each data collection period of the trial is given in Table 3. The mixer was loaded as follows:

1. The hay was added as a single 4×6 round bale weighing approximately 1300 lbs.
2. Once the bale was partially disassembled around the augers, the corn silage was added.
3. Next, the wet corn gluten feed was added.
4. Once the ingredients were partially mixed, the mixer was relocated to an area of feed bins, where the remaining ingredients were added by auger.
5. The mixer was operated at a PTO speed of about 700 RPM during the addition of all ingredients, as well as during a final 3-minute mixing phase after all ingredients had been loaded.
6. The batch was then fed out to the cattle.

TABLE 3

Lactation ration batch composition for the Armstrong Manor knife trial (335 cows).

| Ingredient | Lbs./head | Lbs./batch |
|---|---|---|
| Hay | 4.0 | 1340 |
| Corn silage | 29.5 | 9876 |
| Wet corn gluten feed | 10.8 | 3601 |
| Ground corn | 6.5 | 2178 |
| Supplement | 2.7 | 905 |
| Amino Plus | 2.8 | 938 |
| Limestone | 0.2 | 67 |
| Gold Flake | 0.5 | 168 |
| Total | 56.9 | 19078 |

The mixing times, power usage and PTO RPM for the respective batches are summarized in Table 4. The time taken to initially process the round hay bale before other ingredients were added was about one minute less for the Wing-knife than for the Flat-knife, while the average power used (kW) was about 35% greater. This resulted in a similar amount of energy (kWh) being consumed for the initial bale processing in both cases.

The initial loading phase (Phase 1: hay, corn silage and wet corn gluten feed) was about one minute shorter for the Wing-knife than for the Flat knife, perhaps reflecting its shorter period of initial bale processing, yet the energy consumption using the Wing-knife was greater by about 10%. Surprisingly, the final loading phase (Phase 2) was longer by a minute and 20 seconds with the Wing-knife, which resulted in a higher energy consumption (6.4%) during this period, as well. The reason for the longer mixing time during Phase 2 has not been explained. As a result, both the total mixing time and total energy consumption were greater for the Wing-knife than for the Flat-knife (2.2% and 7.8%, respectively).

The ration produced by the Wing-knife had a smaller particle size distribution than that produced by the Flat-knives. There was a smaller proportion of particles retained on the top two trays of the Jaylor Shaker Box, and a greater proportion retained on the bottom tray, for the Wing-knife compared with the Flat-knife, which resulted in a 9.4% smaller Geometric Mean Size (4.8 vs. 5.3 mm), respectively. This is consistent with the greater energy consumption observed when using the Wing-knives.

TABLE 4

Tractor power and time used, and energy consumed, to mix a batch of Armstrong Manor lactating ration, containing one round bale of hay, using a Jaylor 6850, twin-auger vertical TMR mixer fitted with Jaylor slide-plate augers, a torque metering PTO shaft. and either wing-knives or standard Jaylor Flat-knives, along with the resulting particle size distribution.

| | Wing-knives | Flat-knives |
|---|---|---|
| Bale processing time (min:sec) | 2:35 | 3:30 |
| Bale processing avg power (kW) | 19.1 | 14.1 |
| Bale processing energy (kWh) | 0.82 | 0.81 |
| Loading time (min:sec): | | |
| Phase 1 | 15:03 | 16:01 |
| Phase 2 | 17:00 | 15:20 |
| Total | 32:03 | 31:21 |
| Loading energy (kWh): | | |
| Phase 1 | 8.7 | 7.9 |
| Phase 2 | 14.9 | 14.0 |
| Total | 23.6 | 21.9 |
| Particle size (tray % wt.) | | |
| Top | 5.5 | 8.4 |
| Middle | 38.1 | 39.1 |
| Bottom | 56.4 | 52.5 |
| Largest particle size (inch) | 4.3 | 6.0 |
| Geometric mean size (mm) | 4.8 | 5.3 |

[1] Phase 1: Loading and pre-mixing of hay, corn silage and wet corn gluten feed (timed from bale entry to pause to relocate for loading of remaining ingredients).
[2] Phase 2: Loading of grain and supplements by auger from feed bins and final mixing (timed from the end of Phase 1 to the end of final mixing).

The farm operator did not provide actual fuel consumption nor milk production data, but summarized the results, as follows. There was a 13-15% reduction in total fuel consumption when using the Wing-knives versus the Flat knives, but no apparent difference in average milk production (44-45 kg per head per day) or milk composition (4.4 to 4.5% milk fat, 3.3% milk protein).

The lower fuel consumption was attributed to generally less time spent running the mixer during loading with the Wing-knives. This is consistent with the less time spent mixing observed during Phase 1 loading of the lactating ration but contrasted with the greater time spent mixing during Phase 2, with the Wing-knives. It is likely, that the longer time spent loading and mixing during Phase 2 was an anomaly of that single test batch, compared to what happened overall with the number of batches made each day, including those for dry cows and growing heifers. It is equally possible that the overall savings in fuel consumption were primarily related to reduction in time required to process long forage and mix the higher forage dry cow and heifer rations.

The lack of a detectable difference in milk production and composition is unsurprising given that the nutritional content of the ration was held constant, and the particle size distribution of both rations were within the range expected to minimize sorting while supporting optimal rumen function.

CONCLUSIONS

A Jaylor 6850, twin-auger vertical mixer fitted with Wing-knives processed a round bale at a faster rate than when fitted with Flat-knives and reduced the time for initial loading of the mixer, but with both a higher rate of power use and energy consumption. Yet, over daily usage, the fuel consumption of the mixer tractor was reported by the farm operator to be 13-15% less with the Wing-knives than it was with the Flat-knives, which was attributed to less time spent mixing during loading. The longer mixing time observed during the second phase of loading the lactating ration was unanticipated and is likely not related to the mixing efficiency of the Wing versus the Flat knife but did result in smaller particle size of the ration produced with the Wing-knife. It is therefore conceivable, that should a mixer fitted with Wing-knives be operated slower, or for less time, than one fitted with Flat-knives, it could process a ration faster and with less energy consumption, when yielding a comparable ration particle size distribution.

FIGS. 10A-10F

It is also contemplated that the angles of the angled sections may be downward from horizontal or the knives may be mounted upside down on the bottom side of the flighting.

Also contemplated within the invention are base knives that may be situated directly on the bottom flight 515 or indirectly on the bottom flight, such as for example, on a trailing wing 520 or trailing blade fixed or incorporated into to the bottom flight as shown with reference to FIG. 5A.

Figure 10A:
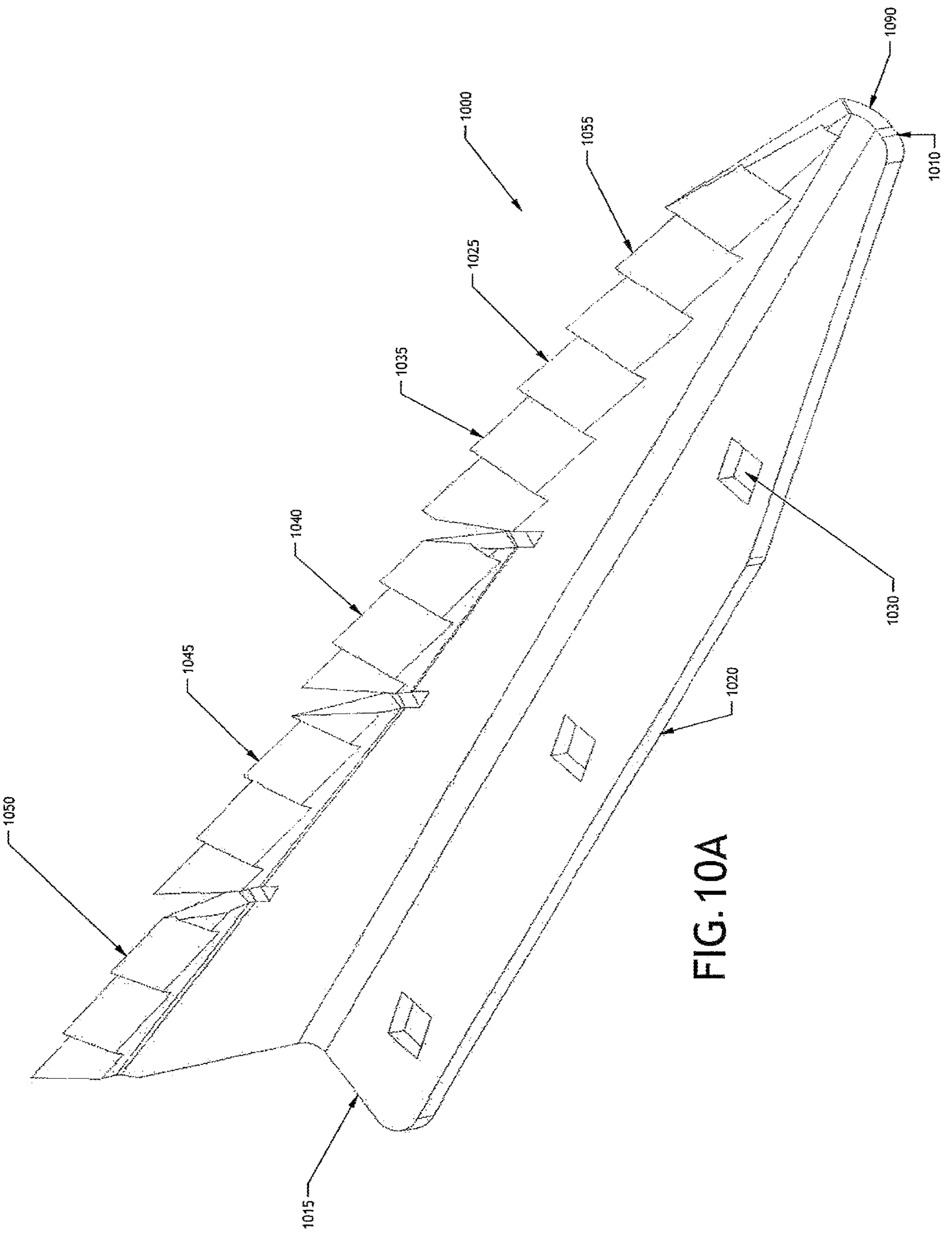
FIG. 10A is an isometric view of one illustrative embodiment of a base knife for an auger according to another aspect of the present invention.
Figure 10B:
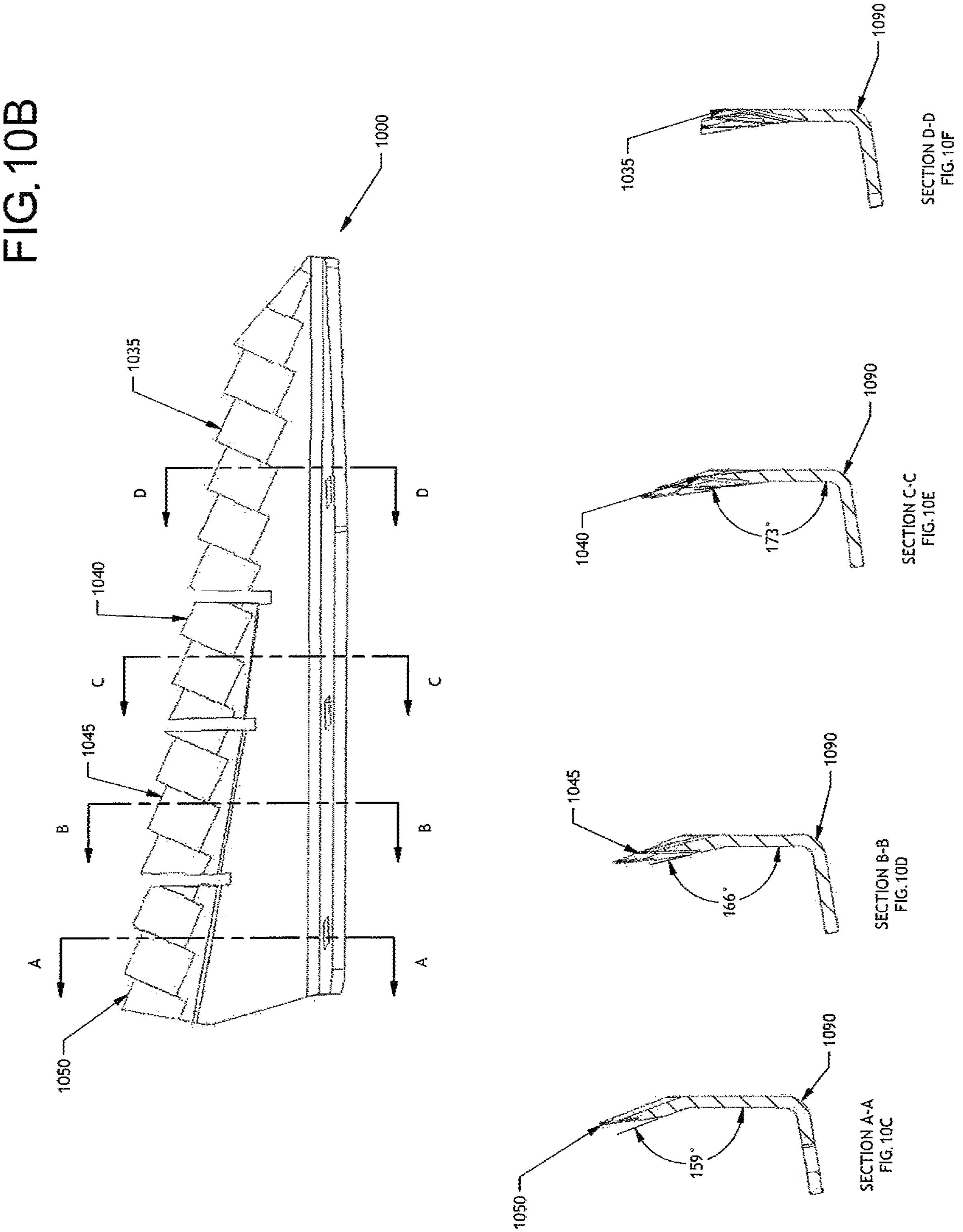
FIG. 10B is a side view of the illustrative embodiment of a base knife for an auger as shown in FIG. 10A with cross-sectional identifiers A-A, B-B, C-C and D-D.

One example of a base knife is shown with reference to FIGS. 10A to 10F. The base knife 1000 includes a front leading end 1010 opposite a trailing end 1015. The base knife 1000 also includes an exterior cutting side 1025 opposite an inboard side 1020. The inboard side 1020 may include any suitable device or means, such as holes 1030, for aiding in mounting the base knife 1000 directly or indirectly to the bottom flight of an auger as described herein with reference to the other knives. The base knife 1000 includes a longitudinal bend that positions the cutting side 1025 at an upward angle, for example at or substantially vertical, relative a bottom of the auger or a bottom of the mixer. Similar to the knives described herein, the cutting side 1025 includes one or more angled sections, for example angled sections 1040, 1045 and 1050 each with an independently varying degree of bend of an angle Y away from the plane of the angled portion of the knife 1000. The angled sections 1040, 1045 and 1050 are shown in more detail in the cross-sectional views along A-A (FIG. 10C), B-B (FIG. 10D), C-C (FIG. 10E), and D-D (FIG. 10F). The exterior cutting side 1025 may include a blade edge 1055. The cutting side 1025 includes the angled sections 1040, 1045 and 1050 each positioned adjacent each other and having an angle from the plane of the angled portion of the knife 100 which increases between section 1040 and 1045 and again between the middle section 1045 and the more trailing section 1050. For example, the leading end section 1035 has no angle away from the plane, the first angled section 1040 has a slight angle away from the plane of, for example, about 7° from vertical also referred to as an obtuse angle of about 173°. The second angled section 1045 has a greater angle away from the plane of, for example, about 14° also referred to as an obtuse angle of about 166°. The most aft angled section 1050 has the greatest angle away from the plane of, for example, about 21° or an obtuse angle of about 159°.

It will be appreciated that, like the other knives described herein, the angled sections may be in different spots along the cutting side 1025 and may be integrated together into a single section. Each section or integrated section may also include a varying degree of bend and the trailing section or sections may have less angle than a section closer to the leading end.

It is believed that by bending a base knife upwards from the bottom of the auger and including a section or sections of the angled cutting edge that bend inward toward the auger post, cutting and/mixing of the bulk material will be more efficient or more effective or a combination of thereof.

One or more illustrative embodiments have been described by way of example. It will be understood to persons skilled in the art that a number of variations and modifications can be made without departing from the scope and spirit of the invention as defined herein and in the claims. Such modifications and variations are within the intended scope of the invention and the contemplation of the inventors.

The invention claimed is:

1. A knife for attachment to auger flighting, the knife comprising:
- an exterior cutting side,
- a leading end defined as the front end during rotation of the auger,
- a trailing end opposite the leading end;
- an inboard side adapted for attachment to the auger flighting;
- the exterior cutting side comprising:
  - a blade edge therealong for engaging material to be cut;
  - an angled section along a portion of the blade edge, angled upward from horizontal by an angle X°, wherein horizontal is a longitudinal plane that is at least partially defined by the leading end of the blade edge, and
  - wherein the angle X° of the angled section increases as the angled section moves from the leading end towards the trailing end, such that the angle X° of the trailing end of the angled section is greater than the angle X° of the leading end of the angled section.

2. The knife of claim 1, wherein the angled section is positioned towards or at the trailing end.

3. The knife of claim 1, wherein the exterior cutting side comprises a plurality of angled sections, each angled section along a portion of the blade edge and each independently angled upward from horizontal by angle X°.

4. The knife of claim 3, wherein the angled sections are positioned adjacent one another.

5. The knife of claim 3, wherein the angled sections are positioned such that one angled section is at the trailing end.

6. The knife of claim 3, wherein each angled section is angled upward from horizontal at a different angle X°.

7. The knife of claim 6, wherein each angled section positioned closer to the trailing end has a greater upward angle from horizontal.

8. The knife of claim 3, wherein the exterior cutting side comprises three adjacent angled sections, each angled section having a greater upward angle from horizontal relative its proximity to the trailing end.

9. The knife of claim 8, wherein the three angled sections have an angle X of about 7-10°, about 14-20° and about 21-30°, respectively.

10. The knife of claim 1, wherein the angle X is from about 1° to about 90°.

11. The knife of claim 1, wherein the angle X is from about 1° to about 45°.

12. The knife of claim 1, wherein the angle X is from about 7° to about 40°.

13. The knife of claim 1, wherein the exterior cutting side further comprises a flat section with substantially no angle upward from horizontal positioned at or toward the leading end.

14. The knife of claim 1 wherein the blade edge is serrated.

15. The knife of claim 1 wherein at least a portion of an underside of the knife comprises a tungsten carbine coating.

16. The knife of claim 1 wherein the angled section or sections of the knife are integrated together and the angle is variable along its length.

17. The knife of claim 1, wherein the knife is a base knife for attachment directly or indirectly to a bottom flight of an auger flighting.

18. An auger comprising a knife mounted to flighting thereon, the knife as defined in claim 1 and wherein optionally the auger is a vertical auger for use in a vertical mixer.

19. A vertical mixer comprising an auger as defined in claim 18.

20. A vertical mixer comprising a knife as defined in claim 1 and optionally wherein the mixer is a feed mixer.

* * * * *